June 14, 1960  W. T. DAVIS  2,940,164
MACHINE FOR INSERTING PLASTIC NOZZLES IN COLLAPSIBLE TUBES
Filed May 29, 1956  4 Sheets-Sheet 1

INVENTOR.
WALTER TODD DAVIS.
BY
Christy, Parmelee & Strickland
ATTORNEYS

INVENTOR.
WALTER TODD DAVIS.
BY
Christy, Parmelee &
Strickland
ATTORNEYS.

June 14, 1960  W. T. DAVIS  2,940,164
MACHINE FOR INSERTING PLASTIC NOZZLES IN COLLAPSIBLE TUBES
Filed May 29, 1956  4 Sheets-Sheet 3

INVENTOR.
WALTER TODD DAVIS.
BY
ATTORNEYS.

June 14, 1960 W. T. DAVIS 2,940,164
MACHINE FOR INSERTING PLASTIC NOZZLES IN COLLAPSIBLE TUBES
Filed May 29, 1956 4 Sheets-Sheet 4

INVENTOR.
WALTER TODD DAVIS.
BY
Christy, Parmelee &
Strickland
ATTORNEYS

United States Patent Office 2,940,164
Patented June 14, 1960

2,940,164
MACHINE FOR INSERTING PLASTIC NOZZLES IN COLLAPSIBLE TUBES

Walter Todd Davis, Wheeling, W. Va., assignor to Wheeler Stamping Company, Wheeling, W. Va., a corporation of West Virginia Filed May 29, 1956, Ser. No. 588,120

10 Claims. (Cl. 29—208)

This invention pertains to the manufacture of collapsible tubes of the type having a plastic nozzle at the discharge end, and is for a machine for automatically inserting and sealing the nozzles in the ends of the tubes.

It has heretofore been proposed to make collapsible tubes for the dispensing of certain substances, particularly opthalmic ointment and other medications wherein a flexible or semi-flexible elongated discharge spout is provided at the discharge end of the tube. Such a tube for example is shown in my copending application Serial No. 572,659, filed March 20, 1956, now Patent No. 2,893,613, dated July 7, 1959, wherein the metal tube is provided with a neck at the discharge end having a tapered socket in the open end. An elongated nipple of polyethylene or other plastic has a correspondingly shaped end which is snugly fitted into the socket. The end of metal tube neck is turned inwardly over the inserted nipple end to hold the nipple firmly and tightly sealed in the socket.

The present invention is for a machine for applying the plastic nipples to the tubes and sealing them in place. In a broad sense the invention constitutes an improvement in or modification of the apparatus shown in my copending application Serial No. 322,749, filed November 26, 1952, now Patent No. 2,762,544, granted September 11, 1956, and it relates to the general type of machine shown in my Patents Nos. 1,674,467 and 1,457,199.

In tube machines of the general type to which the present invention pertains there is provided a turret that is intermittently rotated, and which has a plurality of mandrels projecting therefrom. The mandrels, which are also rotated on the turret, are carried successively through a number of stations. At one station tubes are put on the mandrel; at another they are trimmed to length and threaded. In the present machine the nipples are sealed into the tube ends at a following station, and at a fourth station the finished tubes are removed.

The present invention has for its object therefore to provide a tube machine with automatic means for inserting and sealing the nipples into the tubes. A further object is to provide a machine in which the tubes, which are extruded with a diaphragm in the bottom of the socket in the neck, have this diaphragm pierced so as to provide a passageway for the contents of the tube into the nipple which is subsequently inserted. A further object is to provide a machine by which tubes of the character referred to can be cheaply and economically manufactured with the nipples firmly sealed in the tube ends.

These and other objects and advantages are secured by my invention, one embodiment of which is shown in the accompanying drawings, in which:

Fig. 13 is a view similar to Fig. 12 showing the base of the nipple entered into the socket of the collapsible tube just prior to the final operation of turning the end of the tube in.

Figure 1:
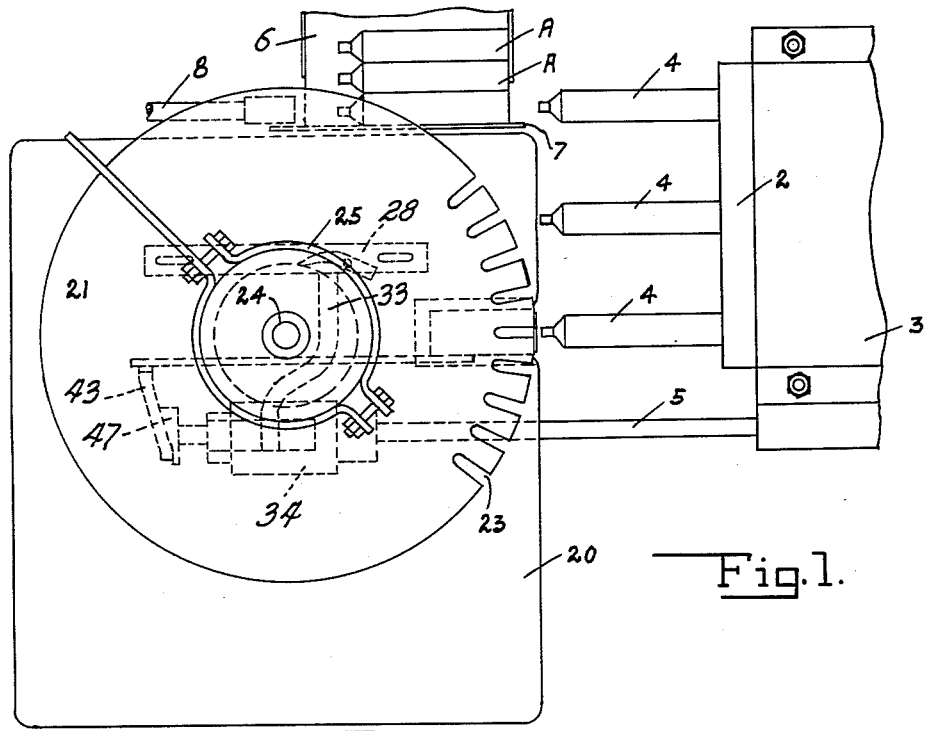
Fig. 1 is a somewhat diagrammatic view showing the general organization of the machine.
Figure 2:
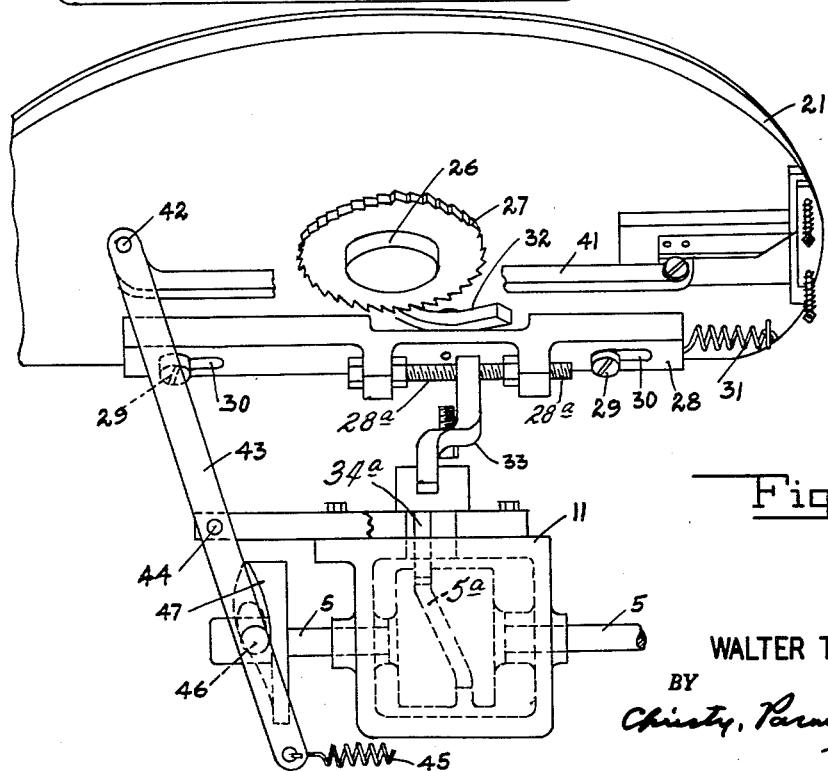
Fig. 2 is a fragmentary view looking at the under side of the turntable portion of the machine, the view being tilted to better illustrate the parts.
Figure 3:
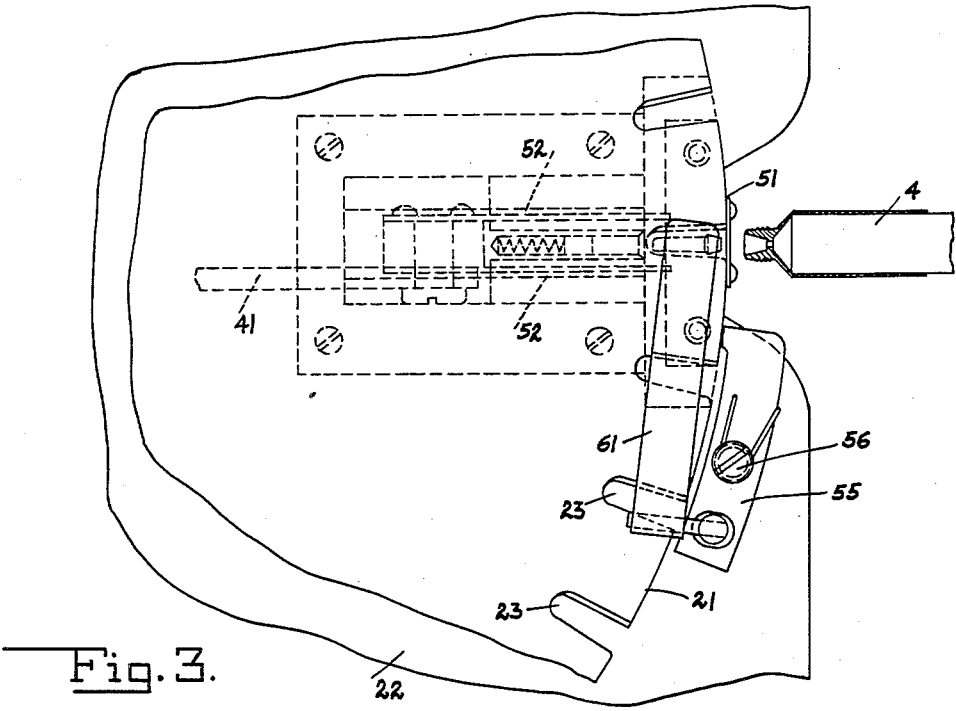
Figs. 3 and 4 are like fragmentary plan views showing a portion of the turntable and the nipple-inserting means first in retracted and then in extended positions, respectively.
Figure 4:
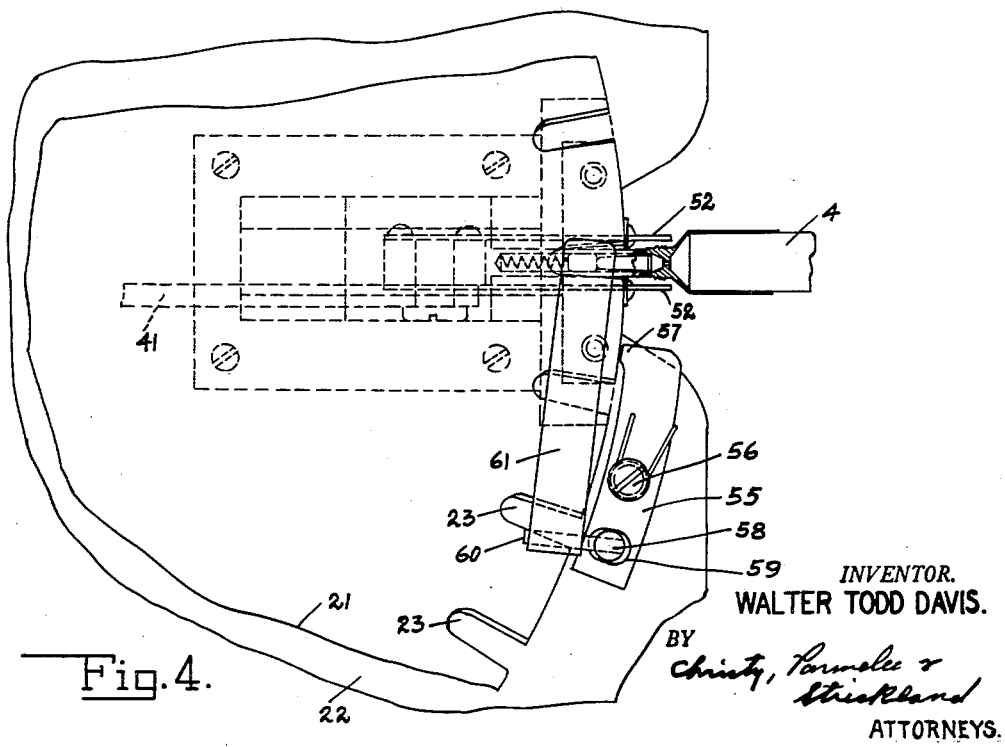

Referring to the drawings, and first to Figs. 1 to 7, the machine is of the type referred to in Patents Nos. 1,674,467 and 1,457,199 having a turret 2 at the end of a head 3. The turret is provided with four equally spaced mandrels 4. This type machine is widely used, and within the head is a system of planetary gears for rotating the mandrels about their axes while a Geneva gear intermittently rotates the turret through an arc of 90°. The machine is provided with a cam shaft 5 which is continuously driven from the same drive as the turret, so that it makes one complete revolution for each 90° movement of the turret. This, too, is a common expedient in machines of this type.

When the tubes are extruded, they are uneven at the open end and the necks are not threaded. Looking in at the front of the turret, it may be presumed to rotate in a counterclockwise direction. At approximately the "nine o'clock" position the tubes are put on the mandrel. At the "six o'clock" position they are trimmed to length and the necks are threaded. The mechanisms for accomplishing this are of known construction, and for clearness of illustration they are not here shown. At the "three o'clock" position (according to the present invention) the nipples are applied by the mechanism to be described, and at the "twelve o'clock" position the tubes are removed from the mandrels.

With the present invention the mandrels 4, which are of a diameter to snugly fit inside the tubes, have a cavity 4a in their outer ends. The tubes to be processed are designated A, and when they are formed they have a body portion a (see Fig. 6), a shoulder a', a neck a'' which is thicker at its base than at its outer end, and in the neck there is a socket b of inwardly-decreasing diameter. There is a partition or seat or diaphragm b' at the bottom of this socket which is imperforate. These tubes are delivered from the extrusion press which forms them onto an inclined pan or apron 6 at the lower end of which is a flange 7, the end of the pan and the position of the flange being such that the tubes gravitate to a position where the lowest one is in alignment with the mandrel 5 at the "nine o'clock" position.

At 8 there is indicated a reciprocable push rod having an operating mechanism 9 (see Fig. 5) which is here illustrated as being similar to that disclosed in Patent No. 1,674,467 above mentioned, and which is operated in timed relation to the movement of the turret to move forward toward the mandrel when the mandrel stops at the "nine o'clock" position, thereby pushing the endmost tube on the pan onto the mandrel. According to the present invention, this push rod is provided with a freely rotatable terminal 10 (see Figs. 6 and 7) having a cavity 11 in its end in the center of which there is a pointed spur 12 that protrudes beyond the end of the terminal, while the end face 13 is beveled to the slope of the shoulder of the tube. A screw 14 in the rod 8 engaging in an annular groove 15 in a reduced stem position of the terminal allows the terminal to rotate, while a ball bearing is shown at 16 to accept the end thrust.

Figure 7:
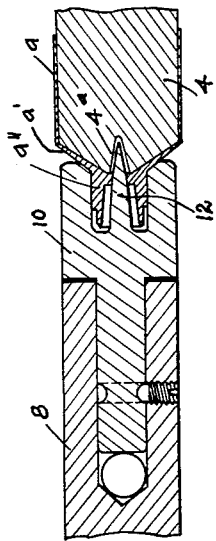
Fig. 7 is a view similar to Fig. 6 showing the tube on the mandrel with the neck of the tube pierced, the mandrel being shown in section.
Figure 6:
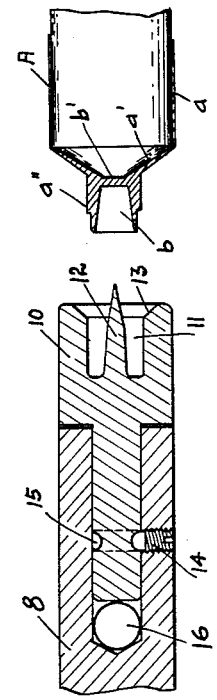
Fig. 6 is a detail longitudinal sectional view of the end of the pusher for pushing the tubes on the mandrel and piercing the neck, the view showing the pusher in confronting relation to the tube which is also shown in section.

When the tube is pushed onto the mandrel, as shown in Fig. 7, the mandrel is rotating about its own axis, but the turret is at rest. The spur 12 pierces the partition or seat b' at the bottom of the tube socket; the cavity 4a in the mandrel providing clearance for the spur. The free rotation of the terminal of the push rod prevents damage or scratching of the shoulder of the tube during this operation.

Figure 8:
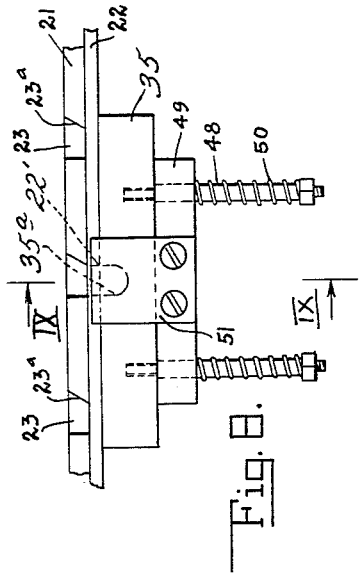
Fig. 8 is an elevation of that portion of the machine through which the nipples are thrust to be entered into the tube ends.
Figure 5:
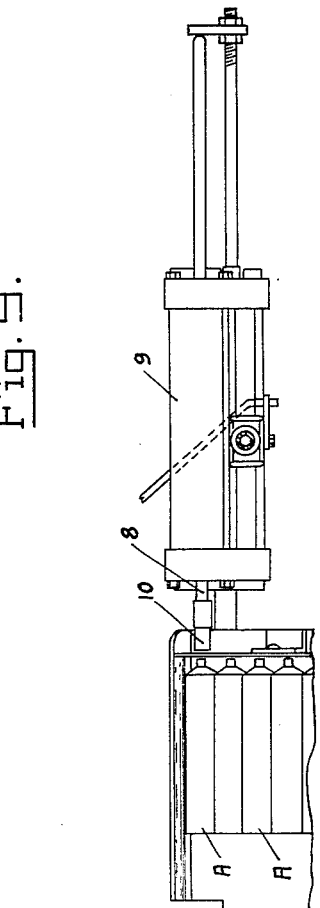
Fig. 5 is a fragmentary plan view of the tube-holding apron and tube-applying mechanism for applying the tubes in succession to the mandrels of the turret and piercing the opening through the neck of each tube, the view being reversed, end for end, with respect to Figs. 1 to 4 inclusive.

Opposite the pan or apron 6 there is a horizontal table 20 in which there is inserted a rotatable disk or turntable 21, the surface of the disk being flush with the surface of the carrier, but the table has a thin portion 22 that extends under the disk. The disk is provided at equal intervals around its periphery with radial notches 23, one side wall of which is vertical and the other side wall of which is beveled at the top surface (see Fig. 8) as indicated at 23a. At the center of the disk on top is hub 24 about which is a friction brake 25. This general arrangement, except for the shape of the notches, is similar to that shown in my application Serial No. 322,749, now Patent No. 2,762,544.

On the under side of the disk or turntable 21 is a hub 26 (see Fig. 2) with ratchet teeth 27 at the periphery. On the under side of the table portion 22 there is a reciprocable bar 28 retained in place by screws 29 passing through slots 30 in the bar. A spring 31 is anchored to one end of the bar, and on the bar is pivoted a pawl 32 for engagement with the ratchet teeth 27 in such manner that reciprocation of the bar 28 intermittently rotates the disk or turntable 21 a fixed distance.

Reciprocation of the bar 28 is secured by an arm 33 mounted on a slide block 34 and having its upper end confined between adjusting screws 28a mounted in lugs on the under side of the bar 28, and by which the relation of the pawl to the ratchet can be accurately adjusted. The slide block 34 has a cam follower 34a engaging in a barrel cam 5a on shaft 5, so that rotation of this shaft moves the bar 28 back and forth in timed relation to the rotation of the turret and the travel of the bar determines the extent or degree of rotation of the turntable 21 on each cycle of operation. The adjusting screws 28a assure the exact indexing required in the operation to be described.

As the disk or turntable 21 is rotated step by step in this fashion, each notch 23 in turn is brought opposite but a little above the "three o'clock" position of a mandrel. The machine operator has a supply of the plastic nozzles or nipples, designated N, spread out on the table 20. Each such nozzle has a truncated conical base n, a relatively long spout n', and a shoulder between the spout and the base. The operator brushes these nozzles into the notches 23 of the disk with her hands, taking care that the base end is pointed toward the periphery of the disk. Each notch is large enough to receive only one nipple, so that this is rapidly and easily accomplished. The nipples in the notches are supported from below by the underlying platform or table portion 22.

Figure 9:
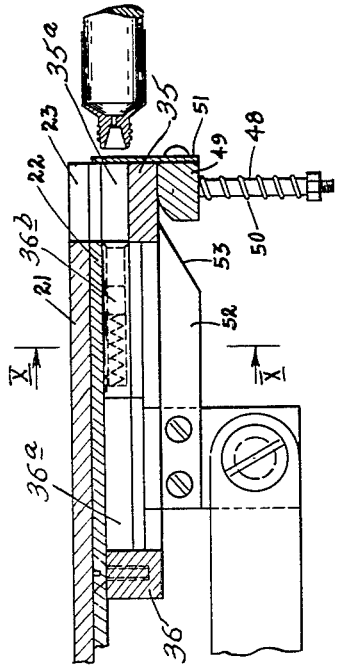
Fig. 9 is a vertical section in the plane of line IX—IX of Fig. 8, showing the pusher for applying the nipples in its retracted position.
Figure 11:
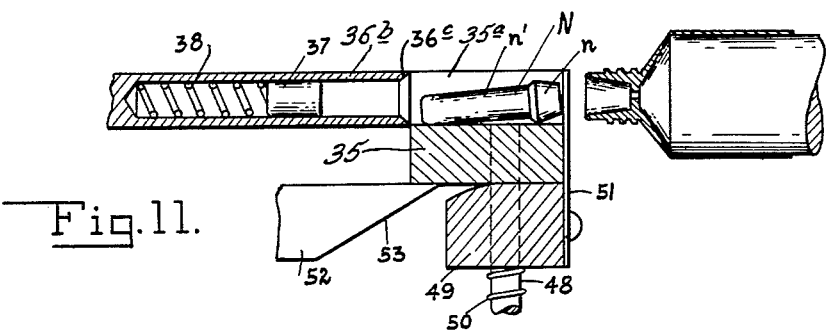
Fig. 11 is a fragmentary section similar to Fig. 9 on a much larger scale, and showing the nipple pusher retracted.
Figure 12:
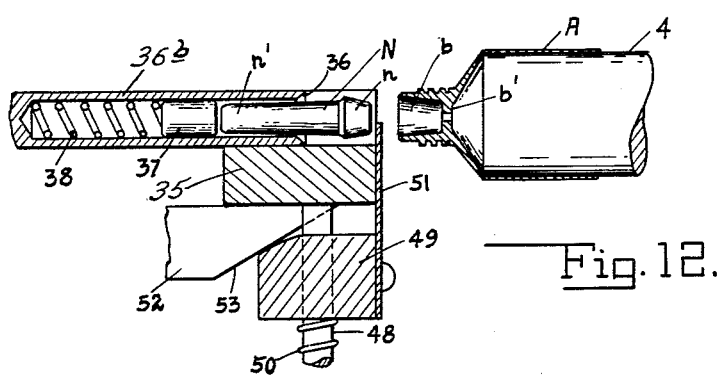
Fig. 12 is a view similar to Fig. 11 showing the nipple entered in the end of the nipple pusher.

At the position confronting the mandrel at the "three o'clock" position, the table 22 is slotted (see Figs. 8, 9 and 11) and the nipple, being then unsupported, will fall from the notch 23 through the slot 22' and be caught in a trough-like guide 35a in a plate 35 secured to the under side of table portion 22, the nozzle assuming approximately the position shown in Fig. 11. The nozzles here shown are greatly enlarged since ophthalmic ointment is dispensed in very small tubes.

Figure 10:
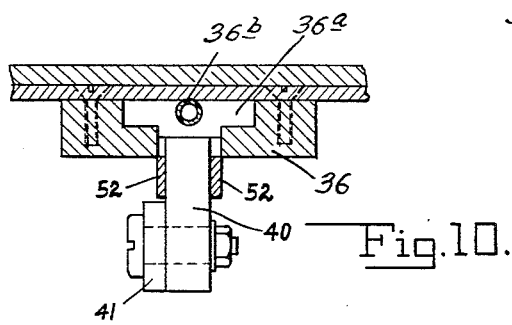
Fig. 10 is a fragmentary transverse section in the plane of line X—X of Fig. 9.

There is a guide block 36 (see Figs. 9 and 10) secured to the under side of the table 22 immediately back of the plate 35 in which is a slide member 36a having a tubular extension 36b at its forward end. The center of this tube is in exact alignment with the axis of the mandrel 4 at the "three o'clock" position. The end of the tube is inwardly chamfered as indicated at 36c, and within the tube there is a small plunger 37 in back of which is a spring 38, and the spring is of such length that when it is fully expanded the plunger is a substantial distance in from the open end of the tube (see Fig. 1). The internal diameter of the tubular extension 36b is such as to slidably received the spout portion n' of the nipple.

The slide member 36a has a downwardly-extending lug 40 thereon projecting down through the guide block, and to this lug is pivotally attached one end of a link 41. The other end of this link is pivotally attached at 42 to the upper end of a lever 43 (see Fig. 2) fulcrumed on the machine at 44, and to the lower end of which is attached a tension spring 45. Between the fulcrum 44 and the spring 45 the lower end of the lever has a cam follower 46 bearing against the face of a cam disk 47 on the end of shaft 5. With each rotation of the shaft 5, the lever 43 will reciprocate the link 41 through a predetermined stroke, thereby moving the slide 36a toward and away from the mandrel at the "three o'clock" position a corresponding distance.

Depending from the plate 35 at each side of the trough 35a are pins 48 on which is slidably carried a cross-bar 49. The cross-bar 49 is urged upwardly against the plate 32 by springs 50 surrounding the guide pins 48. Secured to the outer face of the cross-bar 49 is a thin metal plate 51 which forms a gate normally extending across the end of the receiving trough 35a, as clearly shown in Figs. 8, 9 and 11. Secured to each of the two side faces of the lug 40 are forwardly-projecting fingers or cam elements 52 having beveled ends 53, the top surfaces of which are at the level of the top of the plate 49 when the cross-bar is in its upper position against the plate 35. At a predetermined point in the forward movement of the slide 36a the pointed ends 53 of the fingers will be forced between the bar 49 and the plate 34, depressing the bar 49 to thereby lower the gate from in front of the receiving trough 35a.

Figure 13:
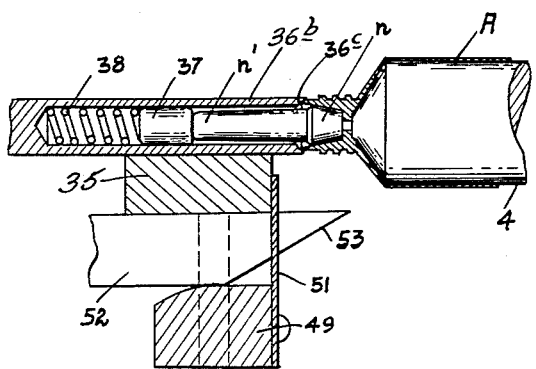
Figure 14:
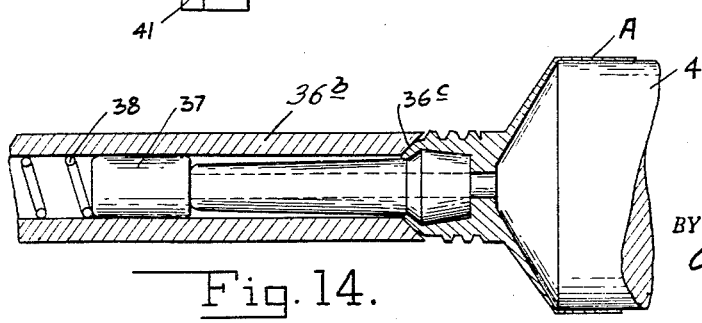
Fig. 14 is a more fragmentary view, but similar to Fig. 12 but on a larger scale, showing the final operation just before withdrawal of the nipple pusher.

The operation which takes place may be followed by reference to Figs. 11 to 14 inclusive. Fig. 11 shows the tubular pushing element or extension 36b on the slide 36a in its retracted position, and it shows a nipple N received in the trough 35a with the end of the mandrel in line with the axis of the pusher or extension 36b. The timing of the cam 47 is such that when the parts are in this position the slide 36a will be moved forwardly, that is, in a direction toward the end of the mandrel. In the initial part of its forward travel the discharge end of the nipple n' will be picked up by the beveled end of the tubular extension 36b and forced into the end of said extension, while the gate 51 will hold the nozzle or nipple from sliding out of the trough. By the time the end of the nipple has entered the tubular extension 36b sufficiently to contact the plunger 37, the pointed ends 53 of the camming fingers 52 will have substantially lowered the gate 51, the parts then being in the position shown in Fig. 12. As the slide 36b continues to move forwardly, the gate 51 will be completely lowered and the tubular extension 36b will have carried the base end of the nipple or nozzle out of the receiving trough 35a, and projected it into the well b in the end of the tube A on the mandrel 4. As the pusher continues to move forward, the spring 38, acting through the plunger 37, will exert a yielding pressure against the end of the nozzle member N, assuring that the base of the nozzle member is seated against the partition b' at the bottom of the well. At the same time the chamfered face 36c of the plunger will engage the thin portion of the neck of the tube beyond the threads which have been previously formed in the thicker inner portion of the neck, and turn the end of the tube in over the shoulder of the nozzle. In Fig. 13 I have shown the nozzle seated in the well in the end of the tube, and in Fig. 14 the turning over of the end of the tube to clamp the nozzle in place has been completed. This turning is readily accomplished by reason of the fact that the mandrel is rapidly rotating the tube while the chamfered face of the pusher is engaging the end of the tube so that the operation is a kind of a spinning operation to secure a uniform and tight sealing of the plastic nozzle in the end of the tube. When the operation has been completed as shown in Fig. 14, the slide 36a will start to retract and as it retracts the camming fingers 52 are withdrawn so that the springs 50 may operate against the crossbar 49 to close the gate 51 to the position shown in Fig. 11.

At this stage of the operation the barrel cam 5a will operate to move the pawl 32 to rotate the turntable 21, bringing the next notch 23 in the disk over the receiving trough 35a. Before the turntable starts its movement under the action of the pawl 32, the timing of the machine is such that the turret will have started its rotation, the turret actually beginning its movement before the gate 51 has closed, so that the nozzle on the tube which has been completed will be lifted up out of the trough 35a and up through the notch 23 before the gate is closed. Since the mandrels carrying the tubes move in an arc, the beveled surface 23a is provided on one side of the notches 23 to provide adequate clearance for the tube nozzle as it is being carried upwardly by the mandrel.

In order to make sure that each nipple is properly positioned in the notch 23 before the notch reaches the position where the nipple drops into the receiving trough 35a and thus prevent the gate from hitting the end of the nipple, there is a finger or lever 55 pivoted to the table at 56, and it has a slight extension 57 at the end closest to the tube-applying position, which finger bears against the periphery of the turntable 21. A torsion spring holds it against the periphery. As each notch 23 in turn moves past the projection 57, the projection 57 is snapped by the spring into the end of the notch so that the end of the nozzle, if it be too near the periphery, will be engaged and the nozzle moved radially inwardly to be completely clear of the gate. Continued rotation of the turntable 21 will cause the following edge of the notch to act as a cam to force the finger 57 outwardly.

Also secured to the table of the machine is a post 58 which is here shown as passing upwardly through an enlarged hole 59 in the end of the lever 55. This post has a pin 60 which overhangs the disk, and on which is a resilient flat leaf spring 61, the terminal of which lies over that notch 23 which is then in the nipple-applying position. The purpose of this spring is to prevent the nipple from lifting out of the notch at this position for any reason.

Should it happen in the operation of the machine that a mandrel having no tube thereon should be presented to the nozzle-applying mechanism, the nipple which is in the pusher 35 will remain in position, and the nipple which falls in on top of it will simply ride along on the next operation of the pusher and fall out of the machine so that the machine will not jam from this cause.

The machine as thus constructed requires but little alteration in tube trimming and threading machines of the type which have long been employed in the art. It does, however, provide a simple trouble-free automatic machine for applying the nipples to the tubes, then sealing the nipples into the tubes cheaply and rapidly, and without damage to the tubes.

Since an operator is always in attendance of such machines, I have found that the use of the turntable 21 and the manual loading of the nozzles into the notches of the turntable can be rapidly, safely and easily effected by the operator, making the use of a turntable for delivering the tubes one at a time to the guide trough 31 preferable to the use of a chute or other type of feed, although such other types of feed mechanisms are not excluded from the scope of the present invention. Various other modifications and changes may also be made in the construction and arrangement of parts within the contemplation of my invention and under the scope of the following claims.

I claim:

1. A machine for inserting a nozzle in the end of a collapsible tube, said machine having a tube-supporting mandrel movable into and out of position to receive a nozzle in the end of a tube supported thereby, a fixed guide trough positioned to confront the end of the mandrel when it is in such position, means for delivering nozzles of larger diameter at one end than the other one at a time to said trough, the nozzles so delivered lying on the trough in an inclined position, a pusher having its longitudinal axis in line with the axis of the mandrel at the aforesaid nozzle receiving position, means for moving the pusher along the guideway from a retracted position where it is remote from the end of the mandrel to an extended position where it will engage the end of a tube on the mandrel, said pusher having an axial opening in the end which moves over the guideway into which the tube nozzle will enter when the pusher moves from the retracted to the extended position, the end face of the pusher being chamfered to facilitate the entry of the nozzle into the opening in the pusher and lift the nozzle to a horizontal position where it may be then thrust into the outer end of the tube on said mandrel and which will also engage and turn over the outer end of a tube neck.

2. A machine of the class described as defined in claim 1 in which there is a gate movable transversely across the guide and provide an abutment to restrain a nozzle which has been delivered to the trough from being moved endwise when its end is being initially engaged by the pusher, and means for removing the gate from the path of the nozzle after it has been so engaged.

3. A machine as defined in claim 1 in which the axial opening in the operating end of the pusher has an axially yieldable plunger therein against which the end of the nozzle which is received in the plunger is pressed when the protruding end of the nozzle is entered into the end of the collapsible tube on the mandrel by the movement of the plunger to its extended position.

4. A machine for inserting and sealing plastic nozzles in collapsible tubes having neck ends designed to receive the end of such a nozzle and wherein one end of the nozzle is larger than the other comprising a mandrel movable into and out of nozzle-receiving position, nozzle-receiving means confronting the nozzle-receiving position of the mandrel for receiving a nozzle to be inserted in the tube and supporting it with its larger end toward the mandrel and its axis inclined with respect to the axis of the mandrel and to a horizontal position, and transfer means for engaging the smaller end of a nozzle so received and holding it so that its axis is horizontal and aligned with the axis of the mandrel and entering its opposite end into the neck end of the tube on said mandrel, said transfer means also being formed for engaging the outer end of tube neck and turning it inwardly about a nozzle which has been so inserted.

5. A machine as defined in claim 4 in which the mandrel is mounted rotatably on a turret, and the movement of the mandrel into and out of nozzle-receiving position is effected by rotation of the turret.

6. A machine as defined in claim 4 in which the transfer means is a reciprocable pusher and there is a gate for closing the nozzle-receiving means to prevent removal of the nozzle while it is being engaged by the transfer means, and means for opening the gate after the nozzle has been so engaged.

7. A machine as defined in claim 1 in which the means for delivering the nozzles to the guide trough comprises a rotatable disk having an annular series of nozzle-holding slots therein with a table under the disk, the table having an opening above said guide trough through which a nozzle may fall from one of the slots into the trough, and means for moving the disk to successively bring said slots into register with said opening when said pusher is in retracted position.

8. A machine as defined in claim 7 in which there are cam-driven mechanisms co-relating the movement of the pusher and the rotation of the disk to the movement of the mandrel.

9. A machine for applying nozzles into sockets provided in the ends of collapsible tubes comprising a mandrel onto which a tube to which a nozzle is to be applied is received, said mandrel being movable from a tube-receiving position to a nozzle-receiving position, a nozzle-receiving guide confronting the end of the mandrel at the nozzle-receiving position and in which the nozzles to be so applied are placed one at a time with the axis of the nozzle when so position in the guide extending in the general direction of the axis of the mandrel, a pusher having a tubular extension aligned with the mandrel at the nozzle-receiving position movable from one end of the guide along and beyond the other end, a gate reciprocable transversely of the nozzle-receiving guide for confining the nozzle so received in the guide against endwise movement during the initial travel of the tubular extension along the guide whereby one end of the nozzle is caused to enter the tubular extension of the pusher with the other end projecting therefrom, means for opening the gate after the end of the nozzle has been entered in said tubular extension, said pusher serving to carry the projecting end of the nozzle beyond the guide and enter it into the neck of a tube on the mandrel, and the tubular end of the pusher having means thereon for engaging the end of the neck of a tube on the mandrel and curl it over around the nozzle.

10. A machine as defined in claim 9 wherein the pusher has means for resiliently pressing the nozzle into the tube end during said curling of the tube end.

References Cited in the file of this patent
UNITED STATES PATENTS

| | | |
|---|---|---|
| 2,155,958 | Schmidt | Apr. 25, 1939 |
| 2,426,401 | Mack | Aug. 26, 1947 |
| 2,431,279 | Remington | Nov. 18, 1947 |
| 2,569,210 | Welk | Sept. 25, 1951 |
| 2,642,655 | Davis | June 23, 1953 |
| 2,672,630 | Bitzer | Mar. 23, 1954 |
| 2,735,487 | Friedman | Feb. 21, 1956 |

UNITED STATES PATENT OFFICE

CERTIFICATE OF CORRECTION

Patent No. 2,940,164                                      June 14, 1960

Walter Todd Davis

It is hereby certified that error appears in the above numbered patent requiring correction and that the said Letters Patent should read as corrected below.

In the grant, lines 2 and 12, and in the heading to the printed specification, line 5, name of assignee, for "Wheeler Stamping Company", each occurrence, read -- Wheeling Stamping Company --; column 4, line 26, for "received" read -- receive --; column 6, line 32, for "on the" read -- in the --; column 8, line 2, for "position" read -- positioned --.

Signed and sealed this 8th day of November 1960.

(SEAL)
Attest:

KARL H. AXLINE
Attesting Officer

ROBERT C. WATSON
Commissioner of Patents